United States Patent [19]

Sakurai

[11] Patent Number: 5,352,477
[45] Date of Patent: Oct. 4, 1994

[54] METHOD FOR MANUFACTURING A CATHODE FOR A GAS DISCHARGE TUBE

[75] Inventor: Hiroshi Sakurai, Takatsuki, Japan

[73] Assignee: Matsushita Electronics Corporation, Osaka, Japan

[21] Appl. No.: 92,182

[22] Filed: Jul. 14, 1993

Related U.S. Application Data

[62] Division of Ser. No. 773,489, Oct. 9, 1991, Pat. No. 5,266,867.

[30] Foreign Application Priority Data

Oct. 15, 1990 [JP] Japan ................... 2-276981

[51] Int. Cl.$^5$ .................................... C23C 14/00
[52] U.S. Cl. ............................ 427/58; 427/124; 427/255.3; 427/383.7; 427/405
[58] Field of Search ............ 427/58, 124, 383.7, 427/255.3, 405

[56] References Cited

U.S. PATENT DOCUMENTS

| | | | |
|---|---|---|---|
| 2,745,772 | 5/1956 | Cassman | 427/124 |
| 2,864,024 | 12/1958 | Ahsmann et al. | 313/633 X |
| 3,904,905 | 9/1975 | Watanabe et al. | 313/576 |
| 4,864,187 | 9/1989 | Sano | 313/355 |

FOREIGN PATENT DOCUMENTS

43-003041 2/1968 Japan .
46-042133 12/1971 Japan .

*Primary Examiner*—Shrive Beck
*Assistant Examiner*—Vi Duong Dang
*Attorney, Agent, or Firm*—Panitch Schwarze Jacobs & Nadel

[57] ABSTRACT

A gas discharge tube using a tunnel effect type electron emitting device as a cathode is provided. The electron emitting device comprises a conductive metal base and a dielectric film formed preferably of a material containing MgO as a main component on the metal base. The dielectric film faces an anode and is exposed to a gas in the tube. In the cathode of this structure, discharge is effected at a relatively low DC voltage.

1 Claim, 7 Drawing Sheets

(Prior art)

Fig. 9

(Prior art)

Fig. 10

(Prior art)

METHOD FOR MANUFACTURING A CATHODE FOR A GAS DISCHARGE TUBE

CROSS REFERENCE TO RELATED APPLICATION

This application is a division of U.S. Patent application Ser. No. 07/773,489, filed Oct. 9, 1991. U.S. Pat. No. 5,266,867.

BACKGROUND OF THE INVENTION

1. Field of the Invention

The present invention relates to a gas discharge tube in which a tunnel effect type electron emitting device is used for a cathode, and a method for manufacturing such a cathode.

2. Description of the Prior Art

Figure 8:
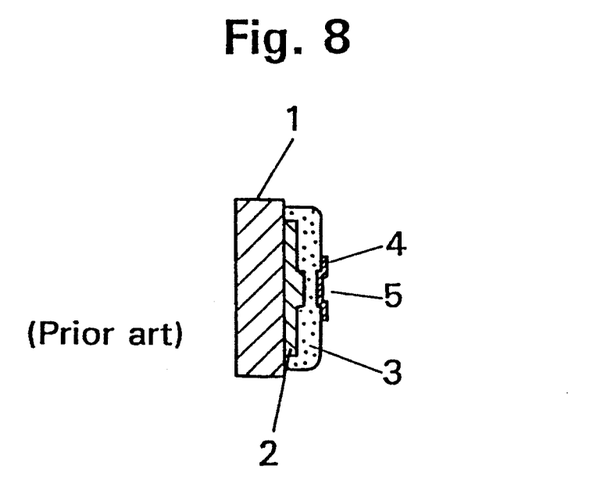
FIG. 8 is e sectional side elevation of a conventional tunnel effect type electron emitting device.

Conventional tunnel effect type electron emitting device such as one disclosed in Japanese Patent Publication No. 43-3041 is primarily intended to be used for a vacuum tube. Such an electron emitting device has a sandwich structure as shown in FIG. 8, which is an M-I-M structure composed of a metal base layer 2, a dielectric film 3 having a thickness of 100 Å, and a surface metal layer 4 having a thickness of 80 Å to 300 Å deposited in this order on a glass substrate 1. An electron emission area 5 is formed on a center portion of the surface metal layer 4.

Figure 9:
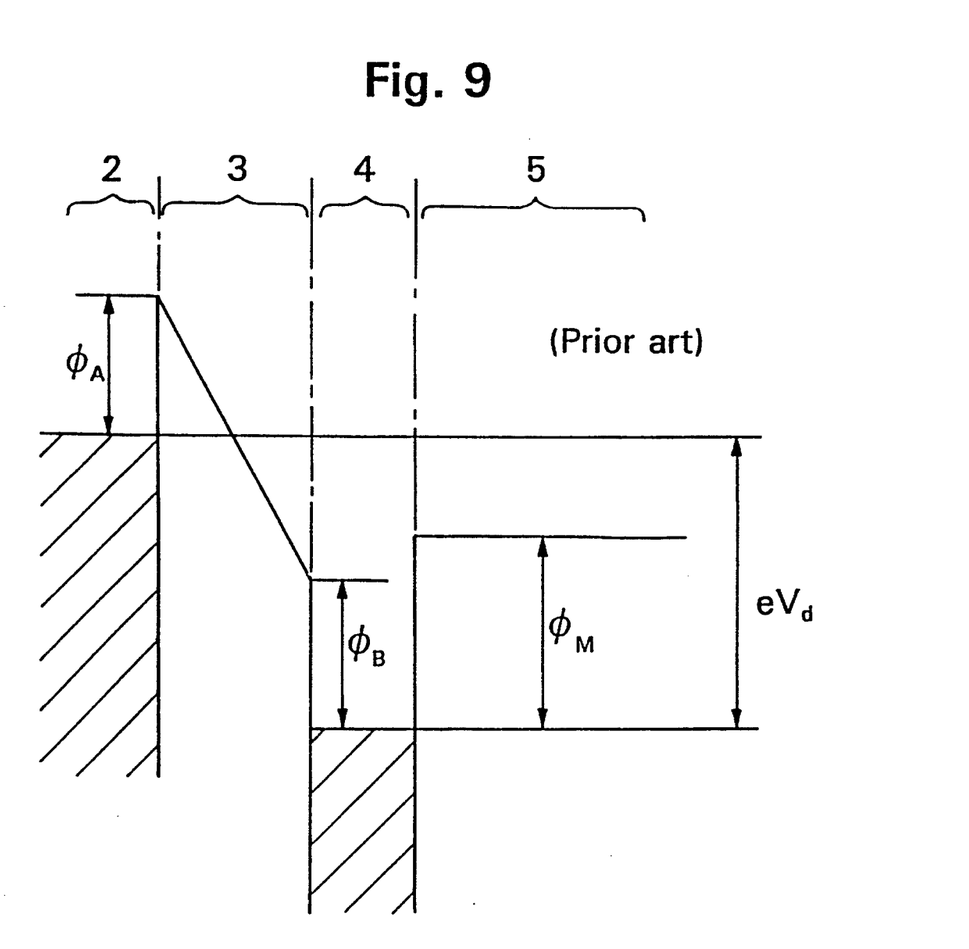
FIG. 9 is an energy level diagram when the electron emitting device of FIG. 8 is operated in a vacuum.

Such an electron emitting device is disposed in a vacuum airtight valve in such a manner that one surface of the electron emitting device on which the above layers are deposited faces an anode. When a DC voltage $V_d$ is applied between the metal base layer 2 and the surface metal layer 4 with the latter being positive, an energy level between the layers as illustratively shown in FIG. 9 is obtained. In this illustration, $\Phi_A$, $\Phi_B$, and $\Phi_M$ are potential barriers and $eV_d$ is a potential energy caused by the applied DC voltage $V_d$ (e: elementary electric charge).

When the potential energy $eV_d$ is greater than a work function of the surface metal layer 4, some electrons of the metal base layer 2 penetrate the potential barrier $\Phi_A$ by the tunnel effect. Some of them further pass through the surface metal layer 4 to be emitted into the vacuum space and then flown to the anode. This emission of electrons to the vacuum space takes place only when the potential energy $eV_d$ is greater than the potential barrier $\Phi_M$.

Figure 10:
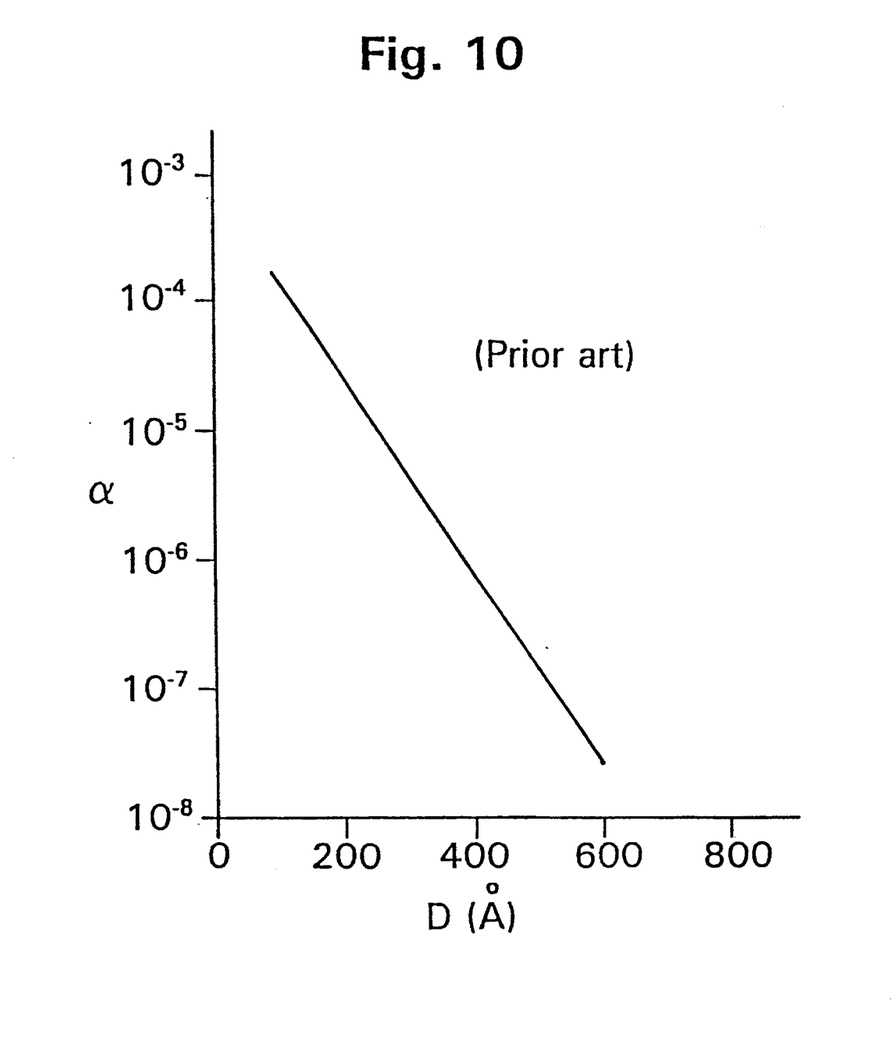
FIG. 10 is a graph showing the relationship between the thickness D of a surface metal layer and the emission efficiency α when the electron emitting device of FIG. 8 is made of Al—Al$_2$O$_3$—Au.

In the conventional electron emitting device described above, however, a diode current $I_d$ which flows from the metal base layer 2 into the surface metal layer 4 is very large. As a result, an emission efficiency $\alpha$, a ratio of an emission current $I_e$ from the electron emission area 5 to the diode current $I_d$, is significantly low. FIG. 10 is a graph showing the relationship between the discharge efficiency $\alpha$ and the thickness D of the surface metal layer 4 in the case of an example of an electron emitting device having an M-I-M structure formed of Al—Al$_2$O$_3$—Au. As is apparent from this graph, the emission efficiency $\alpha$ exponentially decreases when the thickness D of the surface metal layer 4 increases. This indicates that energy loss caused by collision of hot electrons with electrons of the surface metal layer 4 is great, and that the possibility of collisions exponentially increases as the layer thickness increases.

SUMMARY OF THE INVENTION

The gas discharge tube of this invention, which overcomes the above-discussed and numerous other disadvantages and deficiencies of the prior art, comprises an anode end a cathode which faces the anode through a space filled with a gas and emits hot electrons having an energy substantially equal to a first ionization potential of the gas when a DC voltage is applied between the anode and the cathode, wherein the cathode is a tunnel effect type electron emitting device comprising a conductive metal base and a dielectric film of a thickness of 100 Å to 1 μm formed on the surface of the metal base facing the anode, the dielectric film having a surface exposed to the gas.

In a preferred embodiment, the dielectric film is made of a material containing MgO as a main component.

In another preferred embodiment, a conductive intermediate layer is formed between the metal base and the dielectric film.

In still another preferred embodiment, the dielectric film is made of a material containing MgO as a main component, and the intermediate layer is made of a material containing Mg as a main component.

According to another aspect of the present invention, a method for manufacturing a cathode for a gas discharge tube is provided, which comprises the steps of forming a film made of a material containing Mg as a main component on the surface of a conductive metal base, diffusing part of a component of the metal base to part of the film to form an intermediate layer containing Mg, and oxidizing the other part of the film to form a dielectric film made of a material containing MgO as a main component.

The above structure of the electron emitting device according to the present invention is an M-I structure without a surface metal layer, which, if present, would cause energy loss of the hot electrons. Cations produced by ionization of the gas electrically attach to an exposed surface of the I layer, that is, the dielectric film, and a cation layer is formed thereon. The potential difference between this cation layer and the metal base is substantially equal to $V_d$, so that the same strong electrostatic field as in the conventional M-I-M structure can be provided, and therefore, electron emission by the tunnel effect can be obtained.

Having no metal layer on the surface, there is no trouble of energy loss caused by collision of hot electrons with electrons of metal. Thus, hot electrons which reach the surface of the dielectric film overpass the potential barrier $\Phi_M$ with an energy of about $eV_d$ to be emitted to the gas atmosphere through interstices of the cation layer.

Some of the cations on the surface of the dielectric film are neutralized with some of the emitted electrons to be converted into a neutral gas molecules which are removed off the surface of the dielectric film. While, some of the neutral gas molecules floating in the airtight valve collide with emitted electrons to emit second electrons, which serve to supplement the amount of the emitted electrons and at the same time produce cations to charge on the surface of the dielectric film.

In this way, the supplement and the loss of cations on the surface of the dielectric film are kept in equilibrium, maintaining the cation layer having a given amount of cations, which enables stable electron emission. Further, all of the electrons supplied to the metal base are effectively utilized as electron emission, thereby realizing an emission efficiency α of substantially 1.

Thus, the gas discharge tube of the present invention makes possible the objective of affecting emission of electrons with a high emission efficiency.

Further, the gas discharge tube of the structure described above effects gas discharge and light emission at a low discharge maintaining voltage, realizing low power consumption and high luminance.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENT

Figure 1:
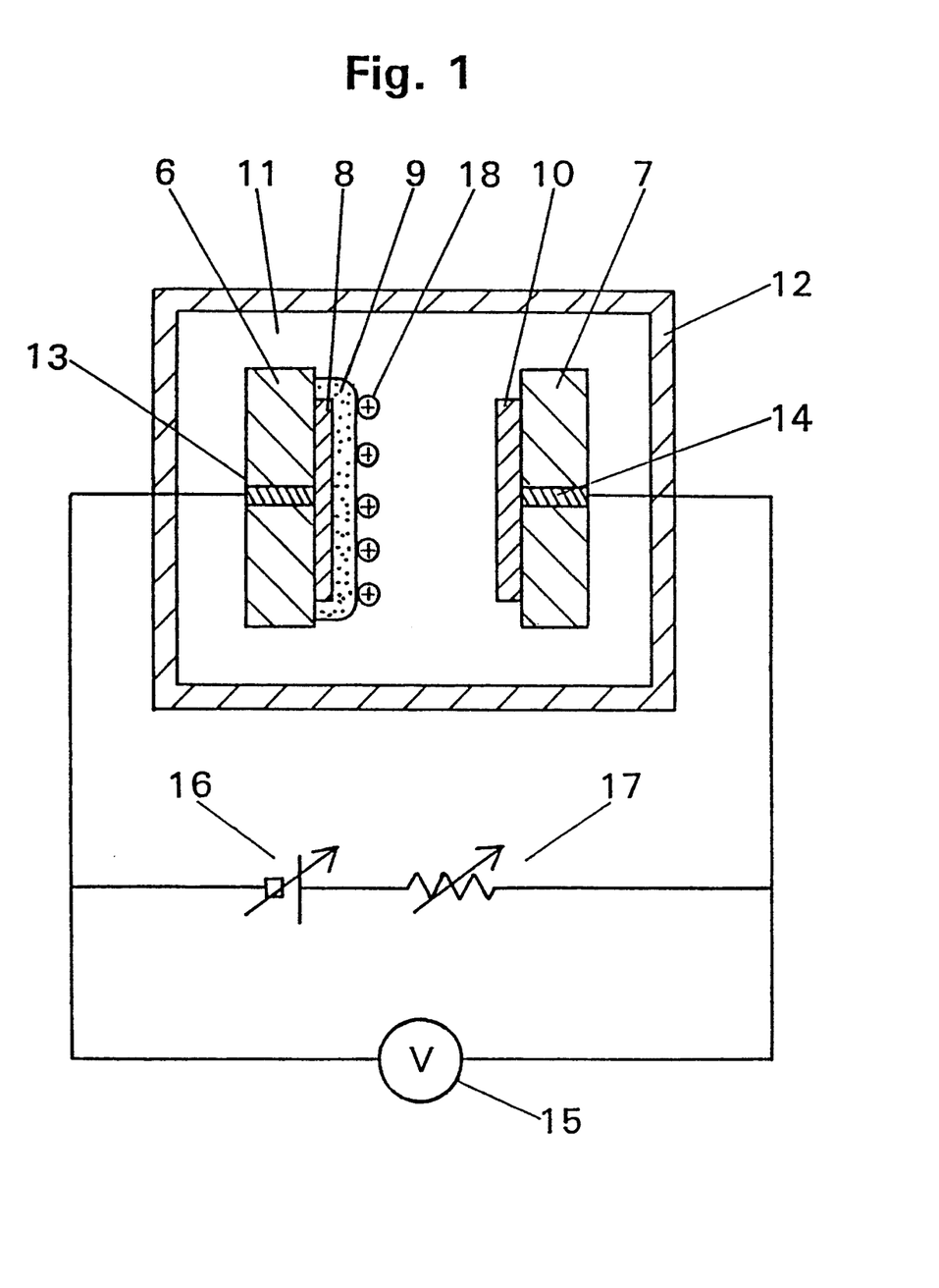
FIG. 1 is a sectional side elevation showing a basic structure of a gas discharge tube incorporating the features of the present invention.

FIG. 1 shows the basic structure for a gas discharge tube manufactured according to the present invention. The reference numerals 6 and 7 denote glass substrates, respectively. On the glass substrate 6 are formed a conductive metal base 8 and a dielectric film 9 in this order, both by vacuum vapor deposition. On the glass substrate 7 is formed an anode 10 to which a positive potential $V_d$ is supplied with respect to the metal base 8. The reference numeral 11 denotes a rare gas contained in an airtight valve 12, and the reference numerals 13 and 14 denote lead terminals for the metal base 8 and for the anode 10, respectively.

The gas discharge tube is provided with a voltmeter 15 which indicates a potential difference $V_d$ between the cathode and the anode, an electric source 16 which supplies a variable DC voltage of $V_s$, and a variable resistance 17. The reference numeral 18 denotes cations of the gas charged on the exposed surface of the dielectric film 9 after start of discharge.

When the voltage $V_s$ exceeds an ignition voltage, a spark discharge occurs transiently between the dielectric film 9 and the anode 10, charging cations of the gas ionized by this discharge on the exposed surface of the dielectric film 9. The potential difference, whose initial value is substantially equal to $V_s$, between this charge and the metal base 8, provides a strong electrostatic field to the dielectric film 9. Subsequently, electron emission by the tunnel effect starts, allowing hot electrons from the metal base 8 to penetrate the dielectric film 9 and to be emitted toward the anode 10. When the discharge reaches the stationary state, the electron emission is stabilized, and this state is maintained. In this state, the voltmeter 15 indicates a value $V_d$ (discharge maintaining voltage) which is significantly lower than the initial value $V_s$ (ignition voltage). An emission current $I_e$ can be controlled by the variable resistance 17.

Figure 2:
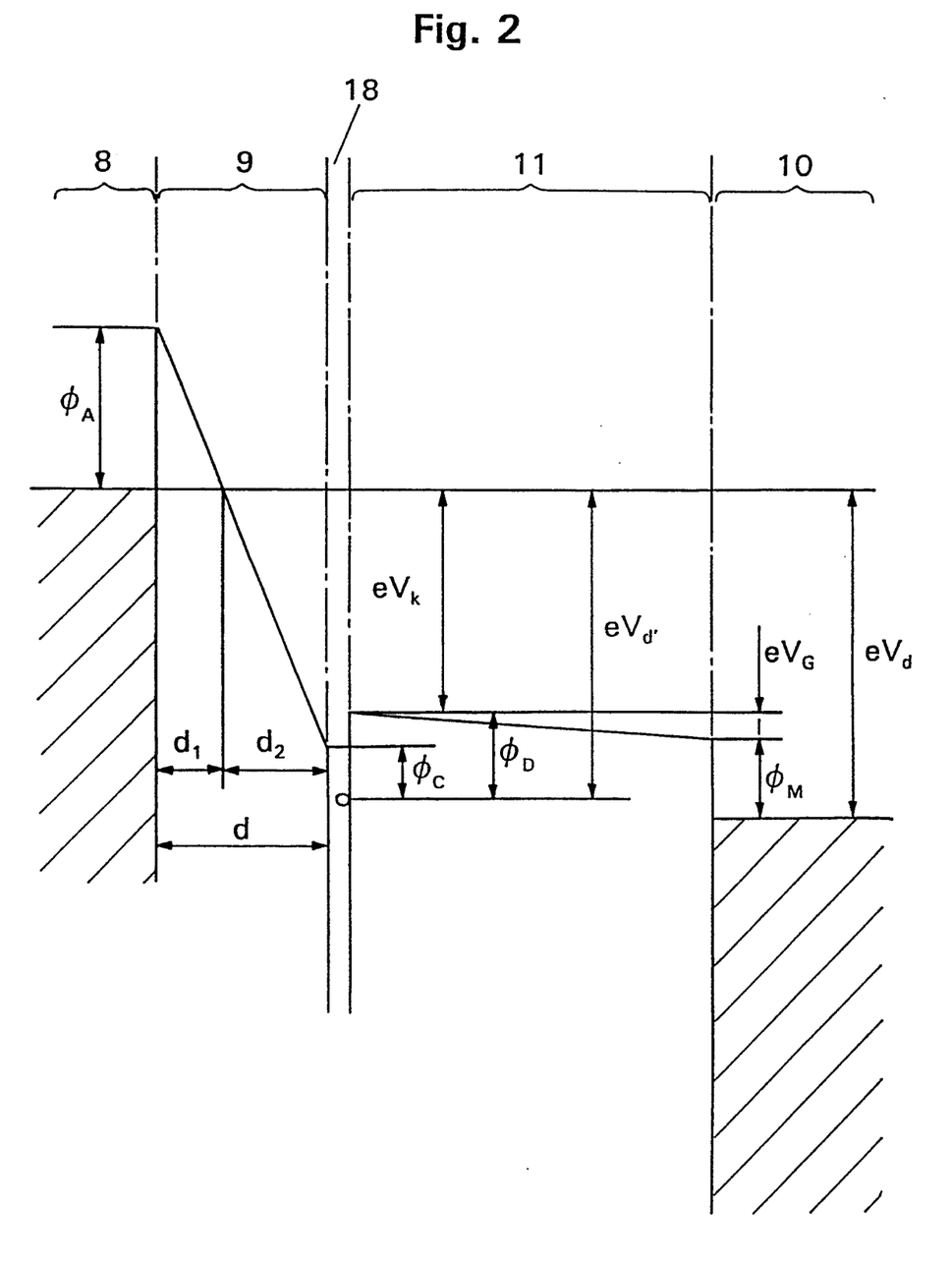
FIG. 2 is an energy level diagram of the gas discharge tube of FIG. 1.

The energy level of the above structure is illustrated in FIG. 2. Some electrons of the metal base 8 pass through the dielectric film 9 of a thickness d to be emitted to the rare gas 11, during which electrons penetrate by the tunnel effect in an area indicated by d1 in FIG. 2 and move through the conduction band of dielectric portions in the other area indicated by d2 in FIG. 2 so as to reach the exposed surface of the dielectric film 9. Supposing the interface between the rare gas 11 and the cation layer 18 is a vacuum, the potential barrier $\Phi_C$ is smaller than the potential barrier $\Phi_D$. The electrons which reach the exposed surface of the dielectric film 9 are hot electrons having an energy $eV_d'$ greater than the potential barrier $\Phi_D$. Therefore, the hot electrons overpass the potential barrier $\Phi_D$ to be emitted into the gas atmosphere. At this time, some of the emitted electrons neutralize the cations, while others collide with gas molecules at a mean initial velocity given by an energy $eV_k, v_e = (2eV_k/m_e)^{\frac{1}{2}}$ ($m_e$: electron mass), thereby ionizing the gas. The electrons of which energy has been lost by collision reach the anode 10 by a slight potential difference $V_G$ in the gas. Some of the cations generated are electrically captured to the exposed surface of the dielectric film 9.

To keep the equilibrium between the electron emission and the ionization of the gas, an accelerating potential $eV_k$ of emitted electrons must be greater than a first ionization potential $eV_{i1}$ of the gas (minimum energy required to take out an electron from the outermost shell of a gas molecule to generate a univalent cation). Hence, the stationary state of the discharge will be maintained when the conditions, $$eV_k > eV_{i1}, eV_d = eV_k + eV_G + \Phi_M \quad (1)$$

are satisfied.

EXAMPLE 1

The conductive metal base 8 was formed of Al to have a thickness of 5 μm, the dielectric film 9 was formed of MgO to have a thickness of 500 Å, and the anode 10 was formed of a 2000 Å thick ITO transparent conductive film, so as to form the structure shown in FIG. 1. Each electrode was formed into a disc of a diameter of 16 mm. The distance between the dielectric film 9 and the anode 10 was set to 0.3 mm. Ne was used as the rare gas 11 (250 Torr). As a result, the relationship between the emission current $I_e$ end the discharge maintaining voltage $V_d$ at a supplied voltage $V_s$ of 125 V as shown in line a of FIG. 3 was obtained.

Figure 3:
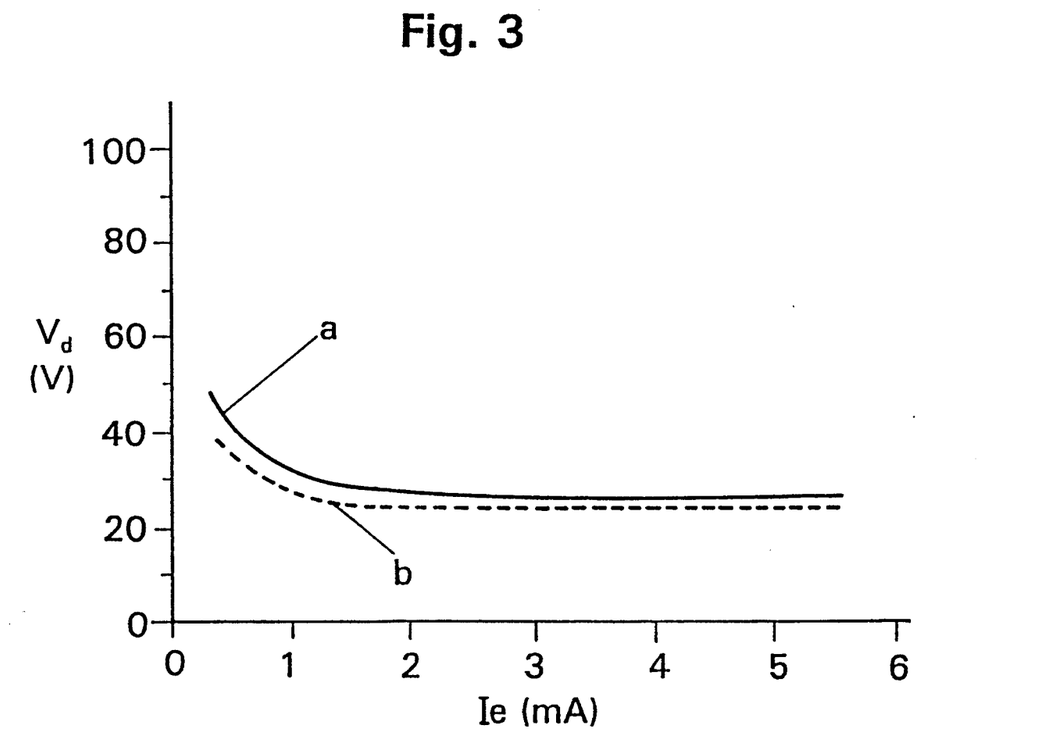
FIG. 3 is a graph showing the relationship between the emission current $I_e$ and the discharge maintaining voltage $V_d$ of the gas discharge tube of FIG. 1.

Line b of FIG. 3 shows the same relationship between $I_e$ end $V_d$ for a variation of this example where MgO doped with several percent of MnO$_2$ was used as the dielectric film 9.

As is apparent from this graph, the gas discharge tube incorporating the electron emitting device of the present invention ensures a considerably large emission current compared with the case using a conventional tunnel effect type electron emitting device, and the operation is stable over a wide range of current values when the current is varied. Also, as the gas discharge tube of the present invention is a diode discharge tube, all electrons supplied from the negative side of the electric source are emitted from the cathode into the gas to be accepted by the anode, and return to the positive side thereof. This means that the discharge efficiency $\alpha$ is substantially 1.

Further, the discharge maintaining voltage $V_d$ is considerably low compared with that of a conventional discharge tube. Supposing the potential barrier $\Phi_M$ is 2 eV, and the potential difference $V_G$ in the gas is 1 V in formula (1), since the first ionization potential $eV_{i1}$ of Ne is 21.56 eV, the discharge maintaining voltage $V_d$ can be only greater than 24.56 V. In FIG. 3, the $V_d$ of line a is 27 V end that of line b is 25 V, both of which satisfy formula (1).

Figure 4:
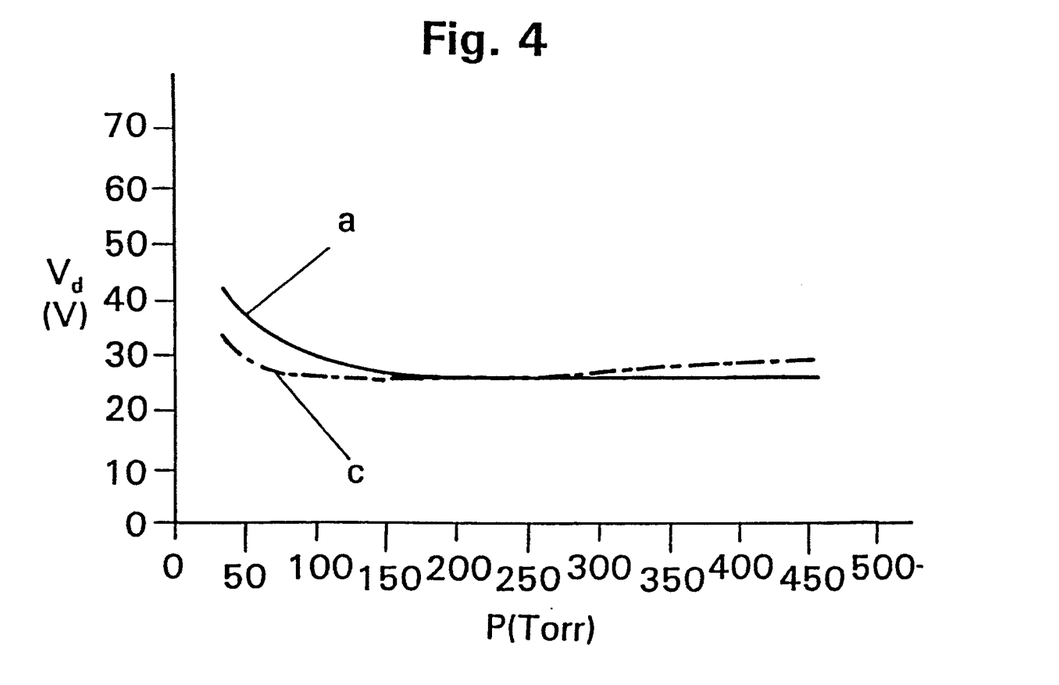
FIG. 4 is a graph showing the relationship between the gas pressure P and the discharge maintaining voltage $V_d$ of the gas discharge tube of FIG. 1.

Line a of FIG. 4 shows the relationship between the gas pressure P and the discharge maintaining voltage $V_d$ when the current $I_e$ was fixed to 2 mA under the aforementioned conditions. Line c of FIG. 4 shows the relationship between P and $V_d$ under the same conditions as line a except that a mixed gas of He, Kr, and Xe at a mol ratio of 88:10:2 was used as the rare gas 11 and the supplied voltage $V_s$ was 185 V. From the above results, it is found that the discharge maintaining voltage $V_d$ can operate under 40 V over a wide range of pressure values when the gas pressure is varied, irrespective of using a mixed gas or a single gas as the rare gas 11.

Table 1 below shows measured values of the discharge maintaining voltage $V_d$ with respect to the resonance voltage $V_r$ and the first ionization voltage $eV_{i1}$ for each gas when the kind of rare gas 11 is varied under the conditions as described with regard to line a of FIG. 3. As a result, it is found that in any of He, Ne, At, Kr, or Xe, the value of the discharge maintaining voltage $V_d$ with respect to the value of the first ionization potential $V_{i1}$ substantially satisfies formula (1).

TABLE 1

|  | He | Ne | Ar | Kr | Xe |
| --- | --- | --- | --- | --- | --- |
| $eV_r$ [eV] | 21.21 | 16.85 | 11.61 | 10.02 | 8.45 |
| $eV_{i1}$ [eV] | 24.58 | 21.56 | 15.76 | 13.996 | 12.127 |
| $V_d$ [V] | 35 | 27 | 27 | 25 | 26 |

The resonance potential $eV_r$ is excitation energy which is capable of transferring to a lower excited state or a ground state by an emitting photon of energy hv. As shown in Table 1, $eV_{i1}$ is greater than $eV_r$. Therefore, any of the above gases is emitting the light with a luminance in proportion to a current during electron emitting. Since the value of the discharge maintaining voltage $V_d$ in this example is as low as a value added several to the value of the first ionization potential of the gas (several times less than that of a conventional discharge tube), the luminous efficiency is several times greater than that of the conventional discharge tube, achieving a low power consumption end high luminance. The luminous efficiency in the case of using Ne gas, for example, is 0.8 lumen/W, which is significantly high as a light emitting device by gas discharge.

EXAMPLE 2

Figure 5:
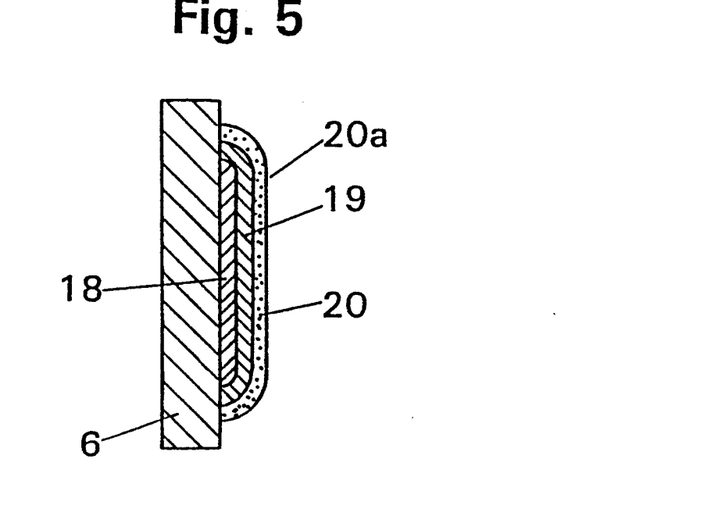
FIG. 5 is a sectional side elevation of a cathode of another example according to the present invention.

FIG. 5 shows another example of a cathode according to the present invention, which comprises a conductive metal base 18 having a thickness of 5 $\mu$m formed of Al on the glass substrate 6 by vacuum vapor deposition. On the metal base 18 is formed a conductive intermediate layer 19 having a thickness of about 500 Å made of a material containing Mg as a main component by vacuum vapor deposition. On the intermediate layer 19 is formed a dielectric film 20 having a thickness of 1000 Å made of a material containing MgO as a main component. The dielectric film 20 has a surface 20a which is exposed to the gas inside a tube and faces an anode.

In a gas discharge tube incorporating the cathode of the above-described structure, a junction which affects the property of the tunnel effect is produced between the intermediate layer 19 mainly containing Mg and the dielectric film 20 mainly containing MgO. As a result, a stable tunnel effect can be obtained compared with a junction produced between different kinds of metal, and thereby reproductivity in manufacture of the gas discharge tube is improved. In other words, in the gas discharge tube manufactured using the cathode of this example, a maximum variation of the discharge maintaining voltage (minimum $V_d$=27 V) was 7 V (maximum $V_d$=34 V), while that in the case of using a cathode without the intermediate layer was 20 V (maximum $V_d$=47 V). Thus, the production yield can be greatly improved.

EXAMPLE 3

Figure 6A:
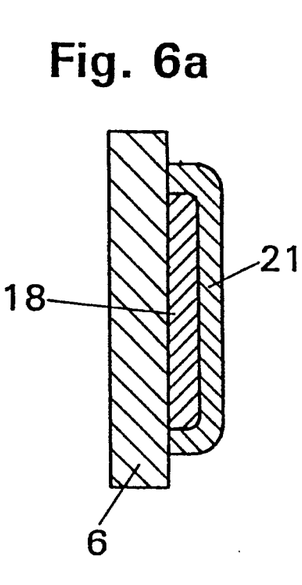
FIGS. 6a and 6b are sectional side elevations, respectively showing steps of manufacturing a cathode of still another example according to the present invention.
Figure 6B:
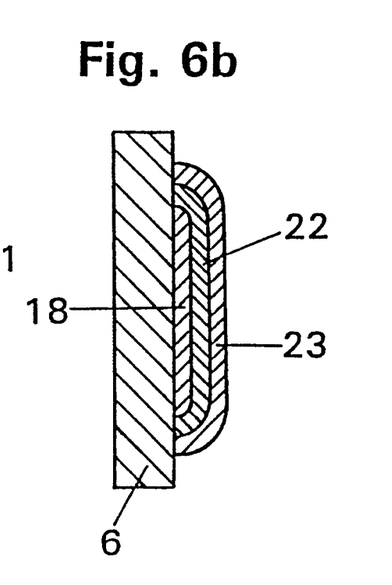

Another method for manufacturing a cathode which can be further stabilized is described below. Referring to FIG. 6a, an Mg film (purity:99.99%) is formed on the surface of the conductive metal base 18 of example 2 by vacuum vapor deposition. Then, by heating in a vacuum at 450° C. for three hours, Al in the metal base 18 is diffused into part of the Mg film 21. By this diffusion of heat treatment, an intermediate layer 22 containing Al in the Mg film 21 is formed as shown in FIG. 6b. The remaining part of the Mg film 21 in the surface area thereof is then oxidized by being exposed in the air at 450° C. for three hours so as to form a dielectric film 23.

The intermediate layer 22 is thus formed from part of the Mg film 21, though the boundary between the intermediate layer 22 and the dielectric film 23 is not so clear as shown in FIG. 6b. The reason of formation of the intermediate layer 22 may be that Al is diffused into the Mg film 21 to reach the surface thereof, but in the oxidation process Al is pushed back from the surface area of the Mg film toward the Al base 18.

In a gas discharge tube incorporating a cathode manufactured by the aforementioned method, the electron emission by the tunnel effect is further stabilized, thereby reducing the variation of the discharge maintaining voltage to 1 V or less. Thus, the production yield can be significantly improved.

The gas discharge tube of the present invention can be manufactured by employing other materials and conditions than those described in the above examples. For example, Au can be used for the metal base 8 instead of Al to obtain a favorable result. When Cr or Fe is used for the metal base 8, however, it will be oxidized too much during the oxidization process. This produces an oxidized layer such as $Cr_2O_3$ or $Fe_2O_3$, degrading the junction between the metal base and the dielectric film.

As a result, the tunnel effect is not obtained, and a deformation problem is caused.

The thickness of the metal base 8 does not effect the above properties of the gas discharge tube of this invention. Thus, a single metal substrate without the glass substrate is possible. Different materials for the metal base 8 produce different conditions of the junction with the dielectric film 9, and therefore energy loss at the electron emission can be caused depending on a combination of the metal base 8 and the dielectric film 9.

Sodalime glass is not preferable since an alkaline component may penetrate the thin Al layer and badly affect the Al base and the dielectric film. Low or non-alkali glass is preferable. The thickness of Al is preferably 1 $\mu$m or more.

Figure 7:
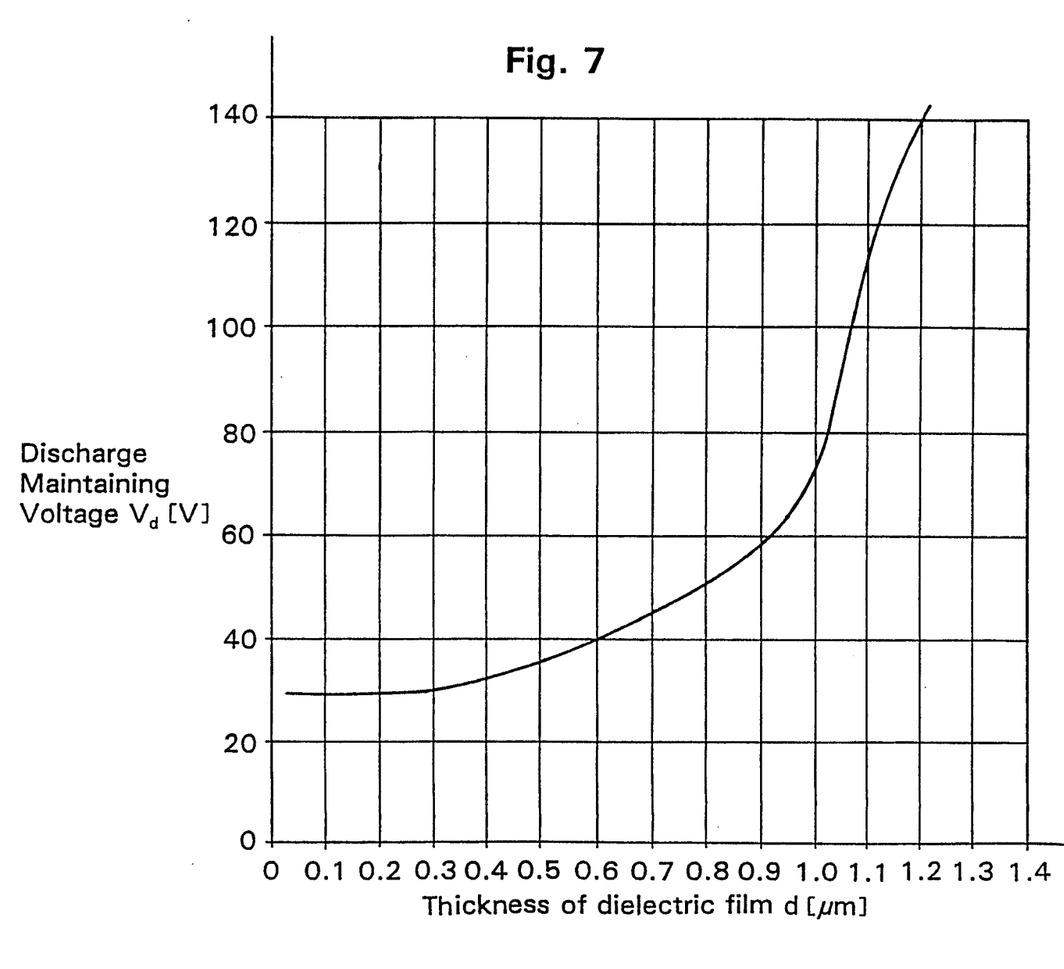
FIG. 7 is a graph of experimental data showing the relationship between the thickness d of a dielectric film and the discharge maintaining voltage $V_d$.

As for the dielectric film 9, an electrically insulating film, such as $Eu_2O_3$, $CeO_2$, $La_2O_3$, or the like, individually or as a mixture thereof, can be used. Dielectric oxides such as those mentioned above can also be used as a dopant for the dielectric film instead of $MnO_2$ used in the above examples. However, as an experimental result, the dielectric film made of a material containing MgO as a main component is practically most preferable in the aspects of the work function, the secondary electron emission efficiency, the energy loss, and the ion collision resistance. Impurities besides a dopant should be removed as much as possible to reduce the energy loss. Crystallinity does not directly effect the tunnel effect, but a low packing rate may reduce the tunnel effect. The dielectric film may be formed by sputtering or electron beam deposition instead of vacuum vapor deposition. The thickness of the film is preferably 5000 Å or less, desirably 300 Å to 3000 Å. If the thickness is more than 1 $\mu$m, the tunnel effect will not be obtained, as shown in FIG. 7. When the distance between the dielectric film 9 and the anode 10 is varied from 0.3 mm used in the above example, the area from which electrons are emitted and the electric current density vary, but the behavior of the electron emission does not basically change.

The intermediate layer 19 was formed by a material containing Mg as a main component, while the dielectric film 20 was made of a material containing MgO as a main component. When the dielectric film 20 has another metal oxide as a main component, the intermediate layer 19 can be formed of a material containing that metal as a main component.

The gas 11 need not be a rare gas. However, when using an active gas such as oxygen or nitrogen, such a gas may oxidize or nitride other substances, thus changing the discharge conditions. The minimum operable gas pressure depends on the electric current density. As an experimental result, when it is 1 Torr or less, a stable operation is not possible.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A method for manufacturing a cathode for a gas discharge tube comprising the steps of:

forming a film made of a material containing Mg as a main component on the surface of a conductive metal base, diffusing part of a component of the metal base to part of the film to form an intermediate layer containing Mg, oxidizing the remaining part of the film to form a dielectric film made of a material containing MgO as a main component.

* * * * *

UNITED STATES PATENT AND TRADEMARK OFFICE
CERTIFICATE OF CORRECTION

PATENT NO. : 5,352,477
DATED : October 4, 1994
INVENTOR(S) : Hiroshi Sakurai

It is certified that error appears in the above-indentified patent and that said Letters Patent is hereby corrected as shown below:

At column 2, line 6, "end" should read --and--.

At column 3, line 4, "affecting" should read --effecting--; line 35, "e" should read --a--.

At column 4, lines 62 and 66, "end" should read --and--.

At column 5, line 42, "At" should read --Ar--; line 55, "hv" should read --h$\nu$--.

At column 7, lines 3 and 29, "effect" should read --affect--; line 35, "Åto" should read --Å to--.

Signed and Sealed this

Seventh Day of March, 1995

Attest:

BRUCE LEHMAN

*Attesting Officer*    *Commissioner of Patents and Trademarks*